Patented Dec. 3, 1940

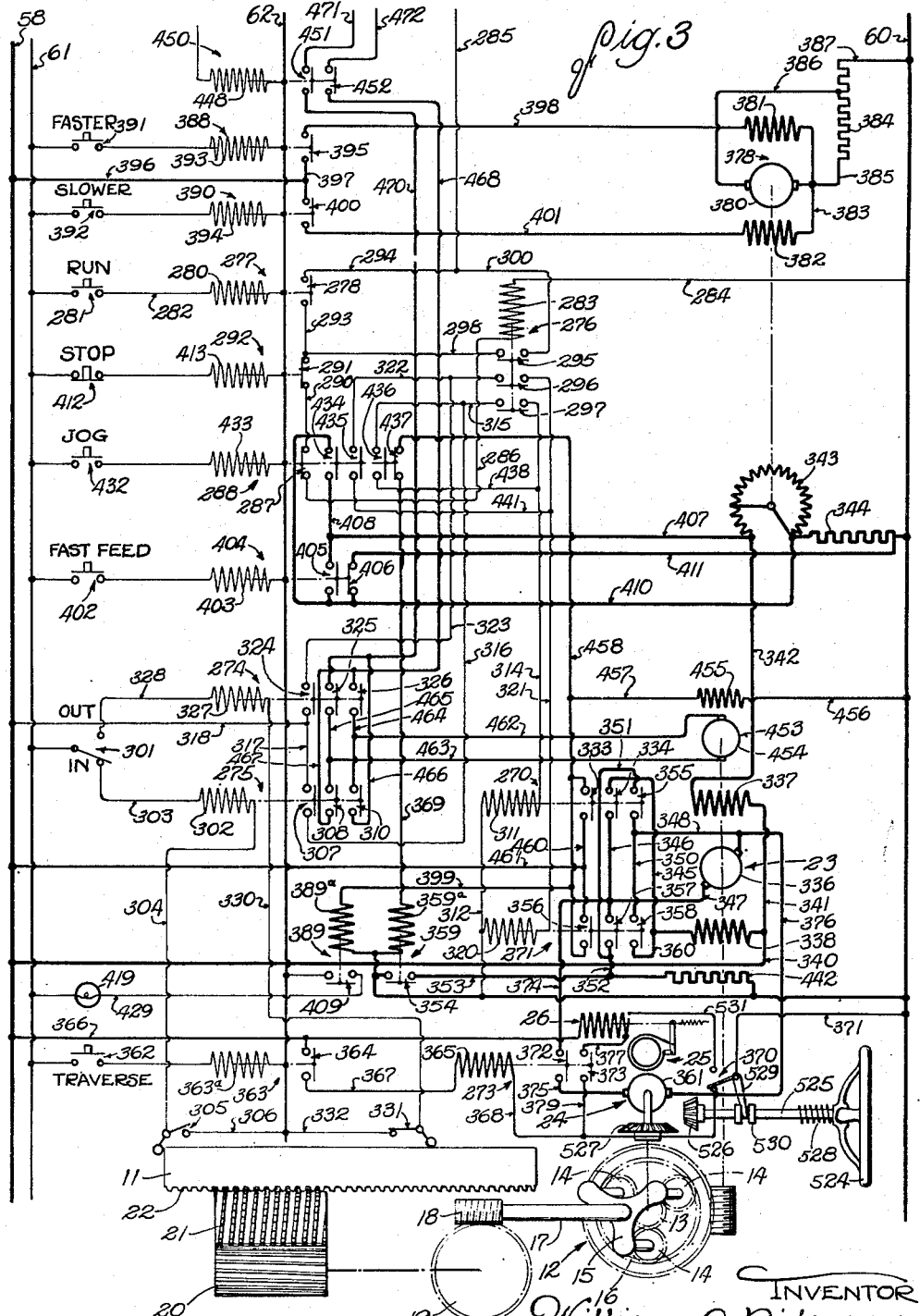

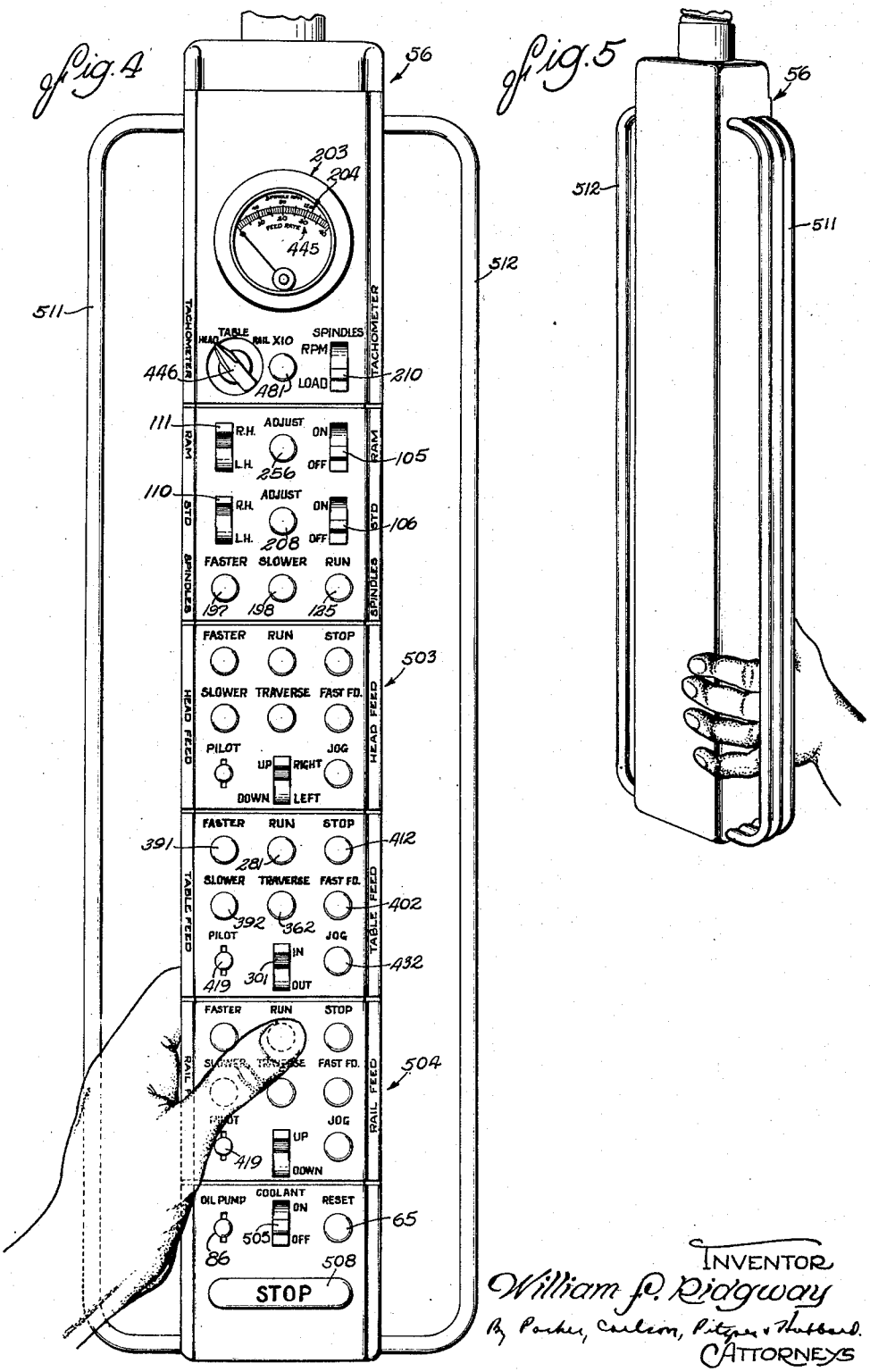

2,224,106

UNITED STATES PATENT OFFICE 2,224,106

MACHINE TOOL

William F. Ridgway, Rockford, Ill., assignor to The Ingersoll Milling Machine Company, Rockford, Ill., a corporation of Illinois Application May 15, 1937, Serial No. 142,782

28 Claims. (Cl. 90—21)

The invention relates to improvements in machine tools, and is particularly adapted for large size machines such, for example, as cross-rail milling machines having a plurality of movable elements subject to operative control. In general, the present invention contemplates various improvements in the novel machine tool arrangement disclosed and claimed in my copending application Serial No. 9,134, filed March 4, 1935, and issued as Patent No. 2,089,814.

One of the objects of the present invention is to provide a machine tool having an improved control arrangement including a mobile panel that may be shifted bodily and manipulated by the use of only one hand, a plurality of digitally operable switches being mounted on the panel within range of the operator's thumb so that he can control even a large and complex machine with great convenience, nicety, and precision from any desired point about the machine.

Another object of the invention resides in the provision in a machine tool having a plurality of operative machine tool elements, of a mobile control panel carrying a plurality of switches adapted to effect a multiplicity of control operations on the various machine tool elements from any desired point about the machine, and a single indicating meter or the like on the panel operable at will to show the condition of operation of any selected one of the machine tool elements, thus indicating to the operator the exact condition of the various elements of the machine so that they may all be operated at maximum load and speed without sacrifice in safety or precision of operation.

Another object of the invention is the provision in a machine tool having a machine tool element driven by a variable speed power actuating means, of a control means adapted selectively to increase or decrease the speed of operation of the machine tool element, and a selectively operable indicating mechanism so interlocked with the control means that it is always rendered operative to apprise the operator of the speed of the element upon actuation of the control means to effect a speed change.

Another object of the invention is the provision, in a machine tool having cooperating rotary and translatory machine tool elements, of a novel interlock between said elements which prevents operation of at least one of said elements upon actuation of its normal control means except when the other of said elements is in operation, but which permits operation of such one element at a relatively slow rate, irrespective of the operation of the other element, in response to the actuation of a separate jog control.

Still another object of the invention is to provide a machine tool controlled from a mobile control panel having a single visual indicating means thereon selectively operable to show a desired one of several operating characteristics of one or more elements of the machine tool such as their respective speeds or the loads thereon.

Further objects and advantages of the invention will become apparent as the following description proceeds and the features of novelty which characterize the invention are pointed out with particularity in the claims annexed to and forming a part of this specification.

For a better understanding of the invention, reference may be had to the accompanying drawings, in which Figure 1 is a perspective view of a cross-rail milling machine, embodying the present invention.

Fig. 3 is a wiring diagram of the table feed mechanism and control arrangement therefor included in the machine tool shown in Fig. 1.

Fig. 4 is an enlarged front elevation of the mobile control panel or pendant of the machine tool shown in Fig. 1 illustrating particularly the position of an operator's hand with respect thereto while the control panel is in use.

Fig. 5 is a perspective view of the rear of the mobile control panel shown in Fig. 4 when supported by an operator's hand, Fig. 5 being drawn on a somewhat smaller scale than Fig. 4.

The features of the present invention may be embodied in various types of machine tools for performing different material removing operations and are particularly suitable for a single or multiple machine having one or more translatory elements and one or more power driven spindles or rotary elements. For purposes of illustration, the invention in its preferred form is herein disclosed as embodied in what is commonly known as a cross-rail milling machine. It will be understood, however, that there is no intention thereby to limit the invention to the specific form or environment illustrated, but that the invention embraces all modifications, adaptations and alternative constructions coming within the spirit and scope of the appended claims.

General machine structure

Figure 1:
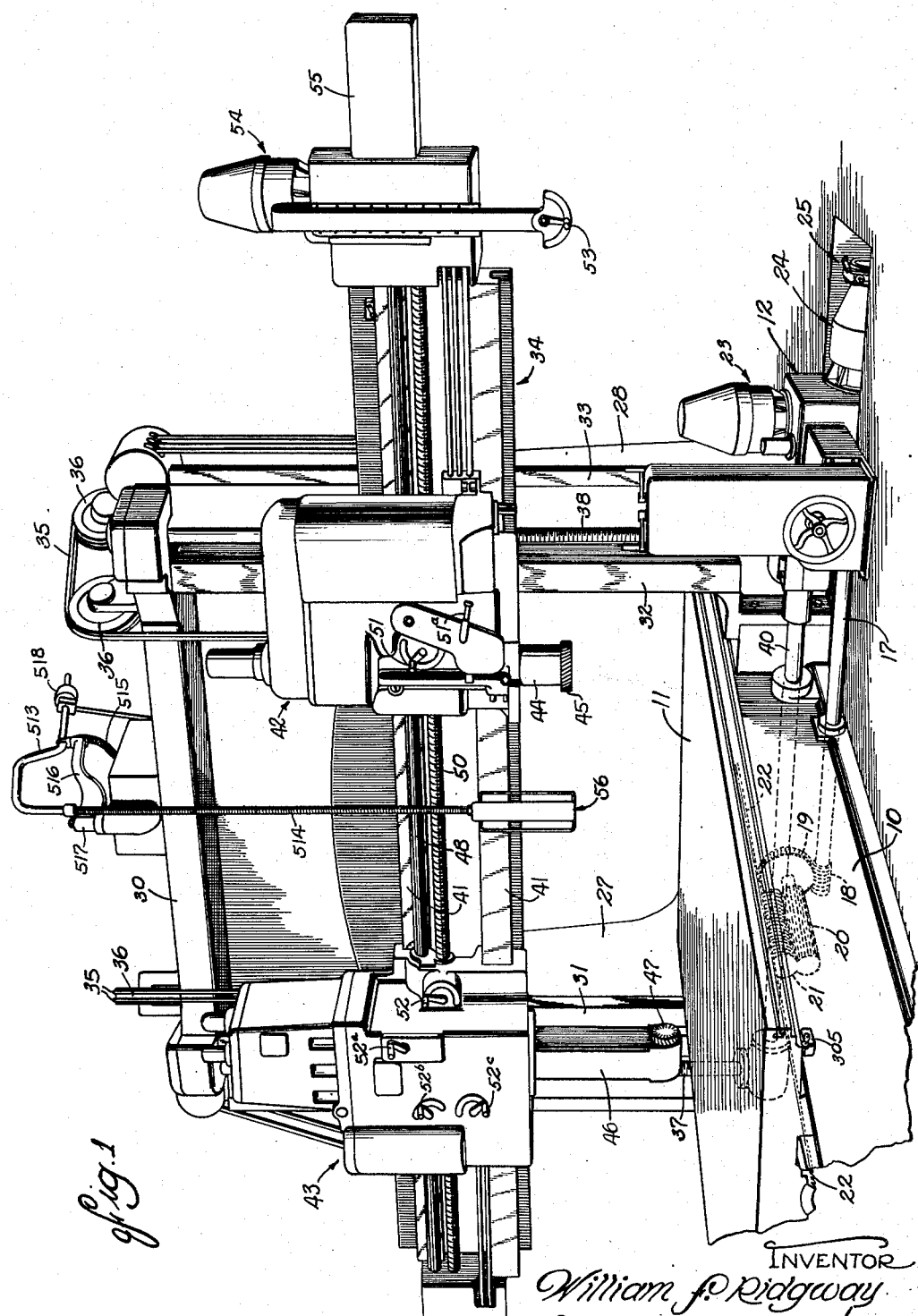

As shown in Fig. 1, the machine selected for purposes of illustration of the invention comprises an elongated horizontal bed 10 which is provided at the top with parallel spaced longitudinal ways. A work supporting table 11 is mounted for endwise reciprocatory movement on the ways and is adapted to be driven selectively in either direction at a rapid traverse rate or at a relatively slower feed rate. For convenience, movement of the table 11 forwardly or to the left as viewed in Fig. 1 will be designated as the "out" movement and the reverse movement will be referred to as the "in" movement.

The driving means may be of any suitable type or form and is herein shown (see Figs. 1 and 3) as comprising a planetary gearing 12 having a central sun gear 13, a plurality of idler gears 14 journaled on a rotatable support 15 and meshing with the sun gear, and a ring gear 16 meshing with the idler gears. The support 15 constitutes the driven element of the gearing 12 and is operatively connected to a horizontal outlet shaft 17. A worm 18 is secured to one end of the shaft 17 and meshes with a worm wheel 19. Rigidly with the wheel 19 is a coaxial elongated spur gear 20 which meshes with teeth formed by peripheral notches intersecting the threads of a worm 21. This worm meshes with an elongated gear rack 22 rigidly secured to the lower side of the table 11 and extending longitudinally thereof. Thus, a translatory motion is imparted to the table 11 at a speed and in a direction depending upon the speed and direction of rotation of the shaft 17. In the present instance, a feed motor 23 and rapid traverse motor 24 are operatively connected respectively with the external and internal gear member 16 and 13 of the differential gear mechanism 12. To obtain a feed movement of the table 11, the sun gear 13 is held stationary and the table is driven only from the feed motor 23. When a rapid traverse motion of the table is desired, the feed drive is supplemented in a differential action by driving the sun gear 13 from the rapid traverse motor 24. Rotation of the sun gear 13 during the feed drive is prevented by a brake 25 (Fig. 3) which normally acts on the armature shaft of the rapid traverse motor 24 and which is adapted to be released by an electric solenoid 26 when the rapid traverse drive is instituted.

Two vertical columns 27 and 28 are rigidly mounted at opposite sides of the bed 10 and preferably substantially midway of the ends thereof and are connected at their upper ends by a horizontal bridge 30 spanning the table 11. Spaced parallel vertical ways 31, 32, and 33 are formed on the forward and inner sides of each of the columns 27 and 28. An elongated horizontal cross-rail 34 is mounted for translation on the ways 31, 32, and 33 and is adapted to be driven in either direction selectively at a rapid traverse rate or at a relatively slower feed rate. Two counterweights (not shown) are suspended respectively within the columns 27 and 28 and are connected to the cross-rail 34 at points adjacent the columns by means of cables 35 running over sheaves 36 on the bridge member 30.

The driving mechanism for the cross-rail 34 preferably comprises two vertical rotary screws 37 and 38 which are positioned respectively between the front ways of the columns 27 and 28 and are anchored at their ends against longitudinal movement. These screws are interconnected by a shaft 40 and are adapted to be driven in synchronism either at a rapid traverse rate or at a relatively slower feed rate by suitable rapid traverse and feed motors (not shown) connected thereto through a suitable differential gearing mechanism. This driving arrangement is substantially identical in its general organization and arrangement with that described above for the table 11.

The front of the cross-rail 34 is formed with vertically spaced parallel longitudinal ways 41 on which one or more tool heads may be mounted for horizontal translation. In the present instance, two selectively available tool heads 42 and 43 are illustrated. The head 42 includes a vertical spindle 44 which is mounted for rotation and axial drive and which is adapted to support a suitable tool such as an end face milling cutter 45 at its lower end. The head 43 includes a vertically reciprocable ram 46 adapted to support a rotatable cutting tool such as a milling cutter 47 adjacent its lower end which is driven by a suitable spindle within the ram. The ram 46 is adapted for rotary adjustment as well as axial movement and means is provided to lock the ram in different angular positions. Self-contained motor drives (not shown in their entirety) are mounted respectively within the heads 42 and 43 for rotating the driving spindles of the cutting tools 45 and 47.

Power drive means is selectively available for traversing the tool heads 42 and 43 along the cross-rail 34 and translating the spindle 44 and ram 46 axially either at a rapid traverse or a variable feed rate. In its preferred form, this means comprises a rotary spline shaft 48 and a stationary screw 50 both of which extend through the tool heads 42 and 43 and are anchored at the ends of the cross-rail 34. Enclosed within the heads 42 and 43 are four connections (not shown) from the spline shaft 48 and under the control, respectively, of clutch actuators 51, 52, 51ª, and 52ª. The first two connections are adapted to cooperate with the screw 50, respectively, to translate the heads 42 and 43. The other two connections include change speed mechanisms 52ᵇ and 52ᶜ, and respectively provide the axial drives for the spindle 44 and ram 46. One end of the shaft 48 is adapted to be driven either at a rapid traverse or a variable feed rate through a planetary gearing similar to the gearing 12 and a change speed mechanism controlled by an actuator 53 from feed and rapid traverse motors 54 and 55.

General control arrangements

An improved form of electrical control is provided for the various translatory and rotative drive mechanisms in order that all of the machine tool elements may be controlled with great nicety and precision and operated with maximum effectiveness. As is hereinafter described in greater detail, all of the control operations are preferably effected from a single mobile panel shown in the form of a pendant 56 that may be moved about and actuated by the use of one hand of the operator. More particularly, the various control switches on the pendant 56 are so arranged that the operator while maintaining the position of the pendant with one hand is able at the same time to operate any of the switches selectively with a digit, preferably the thumb, of the same hand thereby affording a maximum of convenience in operating the machine. To provide the pendant 56 of a size convenient for manipulation by one hand, the substantial number of switches thereon necessary to afford a full and efficient control of the various driving mechanisms are arranged in very compact groups and should be required only to make and break low voltage circuits in order to obtain safety in operation. On the other hand, it is desirable to supply the various electric driving motors for the machine tool elements with current from a relatively high voltage source if they are to operate most efficiently and occupy the minimum amount of space.

The control system illustrated which meets these requirements consists in general of individual sets of control circuits for the three translatory drives and the two rotative drives as well as two sources of electric current of different potential common to all of the sets of control circuits. In addition to a master switch or contactor 57 (Fig. 2) for rendering the entire system operative, each set of control circuits comprises motor circuits adapted to be connected across a source of high potential, for example, 230 volts, primary relay circuits also adapted to be connected across the source of high potential, and secondary relay circuits adapted to be connected across a source of low potential, for example, 12 volts. Direct current is preferably employed. Current from the high potential source is available across main supply lines 58 and 60 while the low potential source is connected across supply lines 61 and 62.

The master switch 57 is under the control of a normally open secondary reset relay 63 having an actuating winding 64 controlled by a normally open push button reset switch 65. Upon closure of the switch 65, an energizing circuit is completed from supply line 61 through conductor 66, switch 65, and conductor 67 to one terminal of the actuating winding 64, the other terminal of the actuating winding being connected to the second low voltage supply line 62. Such energization of the winding 64 closes switch 63 completing an energizing circuit for actuating winding 68 of the master switch 57. Thus, one terminal of the winding 68 is connected to supply line 60 through conductors 70, 71, and 72 and normally closed overload relay contacts 73. The other terminal of the winding 68 is connected to supply line 58 through conductor 75, normally closed emergency stop switch or secondary relay 76, conductor 77, reset relay 63, and conductors 78 and 80. Energization of the actuating winding 68 of the master switch 57 closes the normally open main contacts 81 thereof, interposed in supply line 62, as well as the normally open sealing contacts 82 and 83. At the same time, the normally closed auxiliary contacts 84 are opened thus breaking the circuit through conductor 85 between supply line 61 and 62 of a pilot lamp 86. The pilot lamp 86 is lighted only when the master switch 57 is open, thus indicating to the operator that the reset switch must be actuated in order to set the machine in operation. The closure of contacts 82 and 83 completes a shunt sealing circuit about the reset switch 63 through conductor 97, contacts 83, conductor 88, contacts 82, and conductors 78 and 80 so that the main switch 57 will remain closed after a momentary actuation of the reset push button switch 65. It will be noted that the full high potential between supply lines 58 and 60 is applied to the actuating winding 68 of master switch 57 while the low potential between supply lines 61 and 62 is applied to actuating winding 64 of the reset switch or relay 63 so that the machine can only be set in operation when the control circuit voltage is on as well as the high potential. As a result, an effective electrical interlock is had between the two sources of potential.

*Control circuits for spindle drives*

Figure 2:
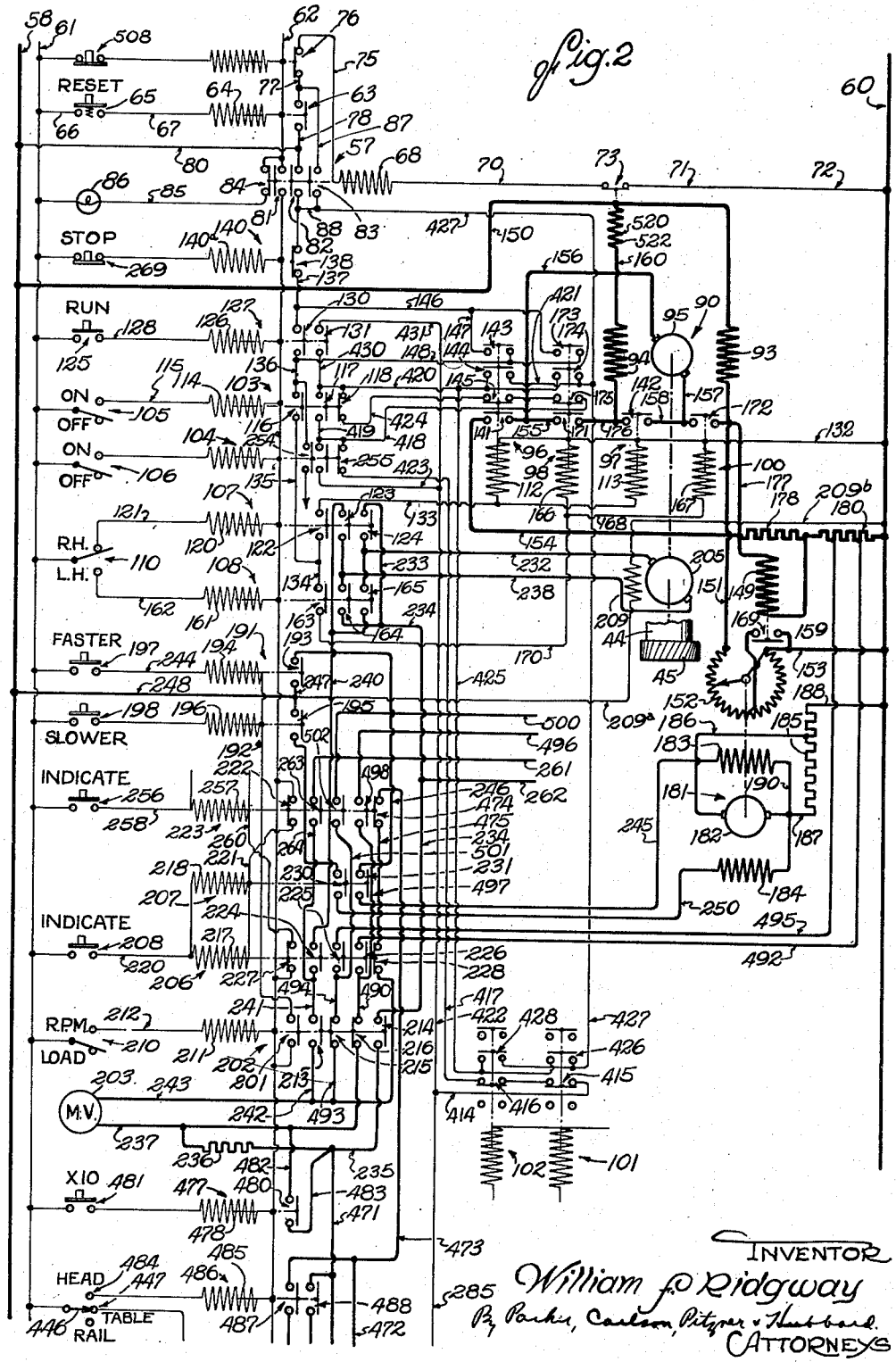
Fig. 2 is a wiring diagram of the spindle driving mechanism and control arrangement therefor included in the machine tool shown in Fig. 1.

The two sets of control circuits for the rotary spindle drives are alike and are connected in parallel across the various current supply lines and hence a description of the circuits for the spindle 44, illustrated in Fig. 2, will suffice for both. A portion of the control circuit for the second spindle included in the ram 46 is also shown in Fig. 2 so as to illustrate the interconnecting control arrangement for selectively rendering either or both of the spindle drives operative.

The spindle 44 is adapted to be rotated in either direction and at different selected speeds by an electric driving motor 90 enclosed within the tool head 42. The motor 90 includes as its principal elements shunt and series field windings 93 and 94 and an armature 95 adapted to be connected reversely across the high potential supply lines either by primary switches 96 and 97 to effect right hand rotation or primary switches 98 and 100 to effect left hand rotation of the spindle 44. The control mechanism for the spindle in the tool head 43 similarly includes a pair of switches for effecting right hand rotation of the driving motor, one of these switches being designated by the numeral 101 and also includes a pair of switches for effecting left hand rotation of the driving motor, one of these switches being designated by the numeral 102.

The spindle driving motors in the tool heads 42 and 43 are selectively cut in or out of circuit by secondary relays or selector switches 103 and 104 respectively. These selector switches are in turn controlled by digitally operable two-position switches 105 and 106 respectively mounted on the pendant 56. In addition, the direction of rotation of the spindle 44 is controlled by a pair of selector switches or secondary relays 107 and 108 which are actuated by a two-position digitally operable switch 110 mounted on the pendant 56. A second two-position switch 111 (see Fig. 4) is also mounted on the pendant 56 and serves to control a similar pair of direction selector switches or relays (not shown) for the driving motor of the spindle and the tool head 43.

When the switch 110 is set for right hand rotation of the spindle 44 as shown in Fig. 2, movement of the "on" and "off" switch 105 to its "on" position completes energizing circuits for actuating windings 112 and 113 of the primary switches 96 and 97 so that the motor 90 is energized for rotation in a right hand direction. Thus, upon closure of the switch 105 in its "on" position, one terminal of actuating winding 114 of selector switch 103 is connected to supply line 61 through conductor 115 and switch 105 while the other terminal is permanently connected to supply line 62. Such energization of actuating winding 114 closes normally open contacts 116 and 117 of selector switch 103 and opens the normally closed contacts 118 thereof. Since the switch 110 is positioned for right hand spindle rotation as indicated by the letters "R. H." in Fig. 2, an energizing circuit for actuating winding 120 of direction selector switch 107 is completed across the supply lines 61 and 62 through switch 110 and conductor 121. The energization of winding 120 closes normally open contacts 122, 123, and 124 of switch 107.

After the selector switches 103 and 107 have been closed as described above, the control circuit is conditioned for actuation of the driving motor contactors or switches 96 and 97 upon momentary closure of a "run" push button 125 on the pendant 56. It will be noted that either or both of the spindle driving motors may be conditioned for operation by the selector switches 105 and 106 and also conditioned for a desired direction of rotation by the selector switches 110 and 111. Then, the selected number of spindle driving motors are set in operation in the desired direction of rotation by a momentary actuation of the single push button 125. Such closure of the push button 125 completes an energizing circuit for an actuating winding 126 of a "run" switch or secondary relay 127 across supply lines 61 and 62 through push button switch 125 and conductor 128. The energization of winding 126 closes normally open contacts 130 and 131 of "run" switch 127 thereby completing an energizing circuit for the actuating windings of the spindle driving motor switches. Thus, with the selector switch positioning described above, the switches 96 and 97 are closed. Common terminals of the actuating windings 112 and 113 of switches 96 and 97 are connected to one supply line 60 through a conductor 132. The other common terminals of the windings 112 and 113 are connected to the second high voltage supply line 58 through a conductor 133, contacts 122, conductors 134 and 135, contacts 116, conductor 136, contacts 130, conductor 137, contacts 82, and conductors 78 and 80.

Upon energization of actuating windings 112 and 113 of the driving motor contactors 96 and 97 as described above, the main contacts 141 and 142 thereof are closed. At the same time, the normally open auxiliary contacts 143 and 144 of switch 96 are closed and normally closed auxiliary contacts 145 thereof are opened. Closure of the auxiliary contacts 143 completes a shunt sealing circuit about the contacts 130 of the "run" switch 127 so that the main motor switches 96 and 97 will remain closed after a momentary actuation of the "run" push button 125. This shunt sealing circuit about the contacts 130 includes conductors 146 and 147, contacts 143, and conductor 148. Closure of the main switch contacts 141 and 142 completes an energizing circuit for armature 95 of spindle driving motor 90 as well as for the series field 94 thereof. The shunt field 93 of the motor 90 is permanently connected across supply lines 58 and 60 through conductors 150 and 151, variable resistance 152, and conductor 153. The closure of contacts 141 connects one terminal of motor armature 95 to supply line 60 through resistors 180 and 178, conductor 154, contacts 141, conductors 155 and 156. Closure of contacts 142 connects the other terminal of motor armature 95 to supply line 58 through conductors 157 and 158, contacts 142, series field 94, and conductors 160 and 150. It will also be noted that actuating winding 149 of relay 159 is energized upon such completion of the motor circuit thereby closing its normally open contacts 169 which shunt out a portion of the shunt field rheostat 152.

Similarly, the positioning of the manually operable selector switch 110 in the position marked "L. H." in Fig. 2 sets up the control circuit for energization of the primary switches 98 and 100 which effect left hand rotation of the spindle driving motor 90 upon a momentary actuation of the "run" switch 125. Thus, when the switch 110 is moved to its "L. H." position, actuating winding 161 of selector relay 108 is connected across supply line 61 and 62 through conductor 162 and switch 110. Such energization of winding 161 closes normally open contacts 163, 164, and 165 of selector relay 108. After the selector switch 110 has been moved to its position for left hand rotation of the spindle driving motor and selector switch 105 moved to its "on" position the primary switches 98 and 100 are actuated in response to a momentary actuation of the "run" push button 125. Thus, the common terminals of actuating windings 166 and 167 of switches 98 and 100 respectively are permanently connected to supply line 60 through conductor 132, while the opposite common terminals thereof are connected to the other high voltage supply line 58 through conductors 168, 170, contacts 163, conductors 134 and 135, contacts 116, conductor 136, contacts 130, conductor 137, contacts 82 and conductors 78 and 80. Energization of actuating windings 166 and 167 closes not only the normally open main contacts 171 and 172 of switches 98 and 100 but also closes the normally open auxiliary contacts 173 and 174 of switch 98 and opens the normally closed contacts 175 thereof. Closure of the auxiliary contacts 173 completes a shunt sealing circuit about contacts 130 of "run" relay 127 through conductors 146 and 148. Closure of main contacts 171 of switch 98 connects one terminal of motor armature 95 to supply line 58 through conductors 156 and 155, contacts 171, conductor 176, series field 94 and conductors 160 and 150. The other terminal of the motor armature 95 is connected to supply line 60 through conductor 157, contacts 172, conductor 177, and resistance 178 and 180. It will thus be seen that the spindle driving motor 90 is connected for left hand rotation upon the actuation of the control devices as described above. In addition, the relay 159 is closed as before, shunting out a portion of the shunt field resistor.

An arrangement is also provided for selectively varying the speed of rotation of the spindles of the tool heads 42 and 43. This speed control arrangement preferably includes operating switches which can be utilized to selectively vary the speed of either of the spindles from the pendant 56 just as the single "run" push button 125 can be used to start either of the spindles from the pendant. In the machine illustrated, the speed of the spindle driving motor 90 is varied by changing the setting of the shunt field rheostat 152 through the medium of a reversible rheostat operating motor 181. This motor 181 includes an armature 182 and a pair of field windings 183 and 184 which may be alternatively connected into circuit for operation of the motor in one direction or the other. The armature 182 is shunted across resistor 185 by conductors 186 and 187. One terminal of the resistor 185 is connected to the supply line 60 by a conductor 188 while the other terminal thereof is connected to the common terminals of field windings 183 and 184 through a conductor 190. The opposite terminals of the field windings 183 and 184 are alternatively connected to supply line 58 by selector switches or secondary relays 191 and 192. The selector relay 191 is provided with a pair of normally open contacts 193 and an actuating winding 194 while the selector relay 192 is similarly provided with a pair of normally open contacts 195 and an actuating winding 196. Closure of a normally open push button switch 197 on the pendant 56 connects one terminal of actuating winding 194 to supply line 61 while closure of a normally open push button 198 on the pendant 56 connects one terminal of actuating winding 196 to supply line 61. The opposite terminals of the actuating windings 194 and 196 are connected to supply line 62 through a common conductor 200 and contacts 201 of a meter scale selector switch or secondary relay 202. In general, the closure of switches 191 or 192 energizes the rheostat motor 182 for rotation in one direction or the other so that on actuating the push button 197, for example, the rheostat will be rotated in a direction to cut resistance into the shunt field 93 and thereby increase the speed of the spindle driving motor 90 while closure of the push button 198 will cause the rheostat motor to cut resistance out of the shunt field of the spindle driving motor and decrease its speed.

An interlock arrangement is preferably provided which makes it necessary for the operator to render a speed indicating device operative before the speed of the spindle driving motor can be changed. This is a particularly advantageous safety precaution since the operator is thus of necessity apprised of the exact speed change which he brings about by changing the setting of the rheostat 152. In the control circuit illustrated, the speed indicating mechanism includes a millivoltmeter 203 mounted at the upper end of the pendant 56 and having a scale 204 thereon calibrated in terms of spindle R. P. M. Current is supplied to the millivoltmeter 203 from a tachometer generator 205 directly connected to the spindle 44. The sets of contacts 123—124 and 164—165 on the direction selector switches 107 and 108 respectively serve to connect the generator 205 to the millivoltmeter 203 in proper circuit relation depending upon the direction of rotation of the spindle and consequently of the generator armature. The tachometer generator 205 is provided with a field 209 permanently connected to supply line 58 through conductors 209ª and 248 and to supply line 60 through conductor 208ᵇ.

The scale selector relay 202 serves to set up the proper connections for giving a reading on the R. P. M. scale 204 while an indicator switch or relay 206 is operable to render the visual indicating meter 203 operative or inoperative at will. In addition, an interlock switch or relay 207 prevents energization of the rheostat operating motor 181 except when the visual indicating meter 203 is conditioned for indicating the speed of rotation of the spindle 44. Thus, when the manual direction selector switch 110 is closed for right hand rotation of spindle 44 thereby closing direction selector relay 107, the circuit for the indicating mechanism is completed and the circuit for the rheostat operating motor is conditioned for completion by switches 191 or 192 upon closure of indicator push button switch 208 and movement of the manually operable scale selector switch 210 to its "R. P. M." scale reading position. That is, when the snap switch 210 is moved to its "R. P. M." position energizing winding 211, the scale selector relay 202 is connected across supply conductors 61 and 62 by a conductor 212 and switch 210. Such energization of winding 211 closes not only the normally open contacts 201 but also normally open contacts 213 and 214 and opens the normally closed contacts 215 and 216.

Closure of indicator push button 208 connects actuating windings 217 and 218 of relays 206 and 207 respectively across supply lines 61 and 62. It will be noted that the windings 217 and 218 are connected in parallel with one common terminal connected to supply line 61 through conductor 220 and switch 208 and with the other common terminal connected to supply line 62 through conductor 221 and normally closed interlock contacts 222 of a second indicating relay 223 that in general serves to connect the meter 203 for indicating the speed of the spindle in ram 46. Such energization of switch actuating winding 217 closes normally open contacts 224, 225, and 226 of relay 206 and opens normally closed contacts 227 and 228 thereof. At the same time, energization of relay actuating winding 218 closes normally open contacts 230 and 231 thereof. The actuation of relays 202, 206, and 207 as described above completes an energizing circuit for the meter 203 to indicate the speed of rotation of spindle 44. Thus, as the spindle is rotating in a right hand direction, one terminal of the tachometer generator 205 is connected to one terminal of the meter 203 through conductor 232, contacts 124, conductors 233 and 234, contacts 214, conductor 235, meter resistance 236, and conductor 237. The other terminal of generator 205 is connected to the second meter terminal through conductor 238, contacts 123, conductor 240, contacts 224, conductor 241, contacts 213, and conductors 242 and 243.

It will be understood that when switch 110 is set for left hand rotation of spindle 44, relay 107 is open while relay 108 is closed so that conductors 232 and 238 extending from the generator 205 are connected to conductors 240 and 234 respectively through contacts 164 and 165 rather than being connected to 234 and 240 respectively as described above through contacts 123 and 124, the result being that the connection of the generator 205 to the meter 203 is reversed upon reversal in the direction of rotation of the spindle 44.

The actuation of interlock relay 207 upon closure of the push button 208 conditions the energizing circuit of rheostat operating motor 181 for completion upon closure of the "faster" or "slower" push buttons 197 and 198. Thus, upon closure of push button 197, for example, one terminal of energizing winding 194 of speed change relay 191 is connected to supply lines 61 through switch 197 and conductor 244 while the other terminal of winding 194 is connected to supply line 62 through conductor 200 and contacts 201 of scale selector switch 202. Energization of winding 194 effects a closure of normally open contacts 193 thus completing an energizing circuit for rheostat motor 181 of such character as to cause it to move the rheostat 152 to cut resistance into the driving motor shunt field 93 and thereby increase the speed of the driving motor. One terminal of rheostat operating motor 181 is connected to supply line 58 through conductor 245, contacts 231, conductor 246, contacts 193, and conductors 247 and 248. The other terminal of motor 181 is connected to supply line 60 through conductors 186, a portion of resistance 185 and conductor 188 as described above. In case push button 198 is closed to decrease the speed of spindle driving motor 90, field winding 184 rather than field winding 183 of rheostat operating motor 181 is connected in circuit. Thus, one terminal of field winding 184 is connected to supply line 58 through conductor 250, contacts 230, conductor 251, contacts 195, and conductors 247 and 248.

It should be noted that no sealing contacts are provided for the speed change relays 191 and 192 nor for the indicator interlock relay 207 so that the push buttons 197 or 198 and the push button 208 must be manually held in their closed positions during all of the time that the rheostat operating motor 181 is energized for changing the speed of spindle driving motor 90. This necessity for manually holding the push buttons in their closed positions centers the operator's attention on the fact that a speed change is being brought about and adds materially to the safety of operation.

A substantially identical control arrangement is provided for the driving spindle of the second tool head 43. This spindle is set in operation by moving the manually operable snap switch 106 to its "on" position, thus connecting actuating winding 252 of selector relay 104 across supply lines 61 and 62 through switch 106 and conductor 253. Such energization of actuating winding 252 closes normally open contacts 254 and 254a thereof and opens normally closed contacts 255 thereof. This conditions the main contactors including contactors 101 and 102 of the control for the second spindle driving motor for closure upon actuation of the "run" push button 125.

A motor driven rheostat speed change arrangement (not shown) is provided for the second spindle driving motor which is identical with that illustrated and described above for the first spindle driving motor 90. In order to effect a change in speed of the second spindle driving motor, it is necessary to condition the meter 203 to indicate the speed of rotation of the second spindle by moving switch 210 to its "R. P. M." indicating position and by closing push button 256. Closure of push button 256 connects one terminal of actuating winding 257 of the meter indicator relay 223 to supply line 61 through switch 256 and conductor 258. The other terminal of the winding 223 is connected to supply line 62 through conductor 260 and contacts 227 of indicator switch 206. It will be noted that the actuating windings 217 and 218 of relays 206 and 207 and actuating winding 257 of relay 223 are interlocked through normally closed contacts 227 and 222 thereof so that either switches 206—207 or switch 223 must be actuated alone rather than simultaneously so that the meter 203 will indicate only the speed of one spindle or the other.

A tachometer generator (not shown) for the second spindle is connected to conductors 261 and 262, conductor 261 being in turn connected to one terminal of indicating meter 203 through normally open contacts 263 of relay 223, conductors 264 and 241, contacts 213 of relay 202 and conductors 242 and 243, while conductor 262 is connected to the other terminal of meter 203 through conductor 234, contacts 214 of relay 202, conductor 235, resistance 236 and conductor 237. Suitable connections (not shown) between the direction selector switch 111 and the second spindle are interposed between the meter 203 and tachometer generator for the second spindle so that the proper alternations in connections will be had upon a change in direction in rotation of the second spindle and its attached tachometer generator, these connections being in general the same as those described above with respect to spindle 44.

Either or both of the spindle motors which happen to be running may be stopped at will by moving the switches 105 and 106 to their off positions. For example, when the switch 105 is opened while the spindle 44 is rotating in a right hand direction, the winding 114 will be deenergized and the contacts 116 opened. The circuit for the windings 112 and 113 will thereby be interrupted and the windings deenergized causing the motor 90 to stop. The sealing switch 143 is also opened and the shunt circuit across contacts 130 is broken necessitating reclosing of the switch 105 and again pressing the push button 125 to restart the spindle 44. Similarly, the switch 106 when opened deenergizes winding 252 allowing contacts 254a to open and interrupt the circuit to the spindle motor of head 43.

It will be seen that in general the secondary switches are connected across the low voltage supply lines 61—62 while the primary switches and driving motors are connected across the high voltage supply lines 58—60. Thus, upon reference to Fig. 2, the actuating windings and digitally operable control switches therefor, of the secondary relays 68, 140, 127, 103, 104, 107, 108, 191, 192, 223, 206, 207, and 202 are all connected across the low voltage supply lines 61—62. On the other hand, the actuating windings of the primary contactors or switches 96, 97, 98 and 100 as well as spindle driving motor 90 are connected across the high voltage supply lines 58—60.

*Control circuits for translatory drives*

The three sets of control circuits for the translatory drives also are alike and are connected in parallel across the various current supply lines 58—60 and 61—62 so that a description of the circuits for the translatory driving mechanism of table 11, illustrated in Fig. 3, will suffice for all.

In general, the table 11 is adapted for either in or out movement at a rapid traverse rate or a relatively slower but selectively variable feed rate. As was noted above, the feed and rapid traverse motors 23 and 24 are connected to the table 11 through the differential gear mechanism 12 which is of such character that the table 11 will be moved at a rapid traverse rate when both motors are in operation and will move at a relatively slower feed rate when only the feed motor 23 is in operation. The control arrangement illustrated is adapted to energize selectively either both of the motors or the feed motor 23 alone and also to energize these motors for operation in one direction or the other in order to change the direction of movement of the table.

An improved arrangement is provided for connecting the feed and rapid traverse motors 23 and 24 in circuit relation to obtain the desired operation while utilizing the minimum number of control switches and relays. In this preferred arrangement, the feed motor 23 is connected across the high potential supply lines 58 and 60 by a pair of reversing switches or contactors 270 and 271. These reversing contactors are alternatively actuatable to energize the feed motor for operation in one direction or the other. A rapid traverse motor contactor or switch 273 serves to connect the rapid traverse motor 24 in parallel relation with the feed motor 23 so that the rapid traverse motor will be energized for operation in one direction or the other depending upon the actuation of the same reversing contactors 270 and 271 which control the feed motor 23. Actuation of the reversing contactors 270 and 271 is controlled by a pair of selector relays 274 and 275.

Operation of either the rapid traverse or feed motors is initiated by a master switch 276 which is in turn controlled by a relay 277. This relay is provided with a pair of normally open contacts 278 which are closed by an actuating winding 280. Upon closure of a digitally operable "run" push button switch 281, the relay winding 280 is connected across the low voltage supply lines 61—62 by switch 281 and conductor 282. Energization of relay winding 280 closes the relay contacts 278 which complete an energizing circuit for actuating winding 283 of the main switch 276. Thus, one terminal of the winding 283 is permanently connected to supply line 60 through conductor 284 while the other terminal thereof is connected to an interlock feeder supply line 285 through conductor 286, normally closed contacts 287 of a "jog" switch or relay 288, conductor 290, normally closed contacts 291 of a "stop" switch or relay 292, conductor 293, contacts 278 of starting switch or relay 277, and conductor 294. This energization of actuating winding 283 of the main switch 276 closes the normally open sealing contacts 295 thereof as well as its normally open main contacts 296 and 297. The sealing contacts 295 complete a shunt sealing circuit about the starting relay contacts 278 through conductors 298 and 300 so that the main switch 276 will remain closed after a momentary actuation of the manually operable "run" push button 281.

Closure of the main contacts 296 and 297 of switch 276 completes an energizing circuit for one or the other of the reversing contactors 270 or 271, depending upon the setting of a manually operable snap-type selector switch 301 which controls the selector relays 274 and 275. Thus, if the selector switch 301 is set for "in" movement of the table 11, this being its position shown in Fig. 3, one terminal of an actuating winding 302 of selector relay 275 will be connected to the low voltage supply line 61 through switch 301 and conductor 303 while the other terminal of the actuating winding will be connected to low voltage supply line 62 through a conductor 304, normally closed limit switch 305 and a conductor 306. This energization of actuating winding 302 closes the normally open contacts 307, 308, and 310. An energizing circuit is thus completed for actuating winding 311 of the reversing contactor 270. One terminal of this winding is permanently connected to supply line 60 through conductors 312 and 313 while the other terminal of the winding is connected to supply line 58 through conductor 314, contacts 297, conductors 315 and 316, contacts 307 of relay 302 and conductors 317 and 318. Similarly, if the selector switch 301 is set for "out" movement of the table, actuating winding 320 of reversing contactor 271 is energized. Thus, one terminal of winding 320 is permanently connected to supply line 60 through conductors 312 and 313 while the other terminal thereof is connected to supply line 58 through conductors 321, contacts 296 of main switch 276, conductors 322 and 323, contacts 324 of relay 274 and conductors 317 and 318. In such case, the normally open contacts 324, 325, and 326 of relay 274 are closed upon energization of relay actuating winding 327. This winding 327 is energized upon movement of the switch 301 to its "out" position, one terminal of the winding being connected to the supply line 61 through switch 301 and conductor 328 while the other terminal is connected to supply line 62 through conductor 330, normally closed limit switch 331 and conductor 332.

The energization of winding 311 of reversing contactor 270 closes the normally open contacts 333, 334, and 335 of this contactor which serve to connect the motor 23 across the high voltage supply lines 58 and 60. It will be noted that the feed motor 23 is provided with an armature 336, a shunt field winding 337 and a series field winding 338. One terminal of the shunt field winding 337 is permanently connected to the supply line 58 through conductors 340 and 341 while the other terminal is normally connected to supply line 60 through conductor 342 and rheostat 343, conductor 410, contacts 406, and conductor 411. One terminal of the series field 338 is permanently connected to supply line 58 through conductor 340 while the other terminal thereof is connected to one terminal of the motor armature 336 upon closure of contactor 270 through conductor 345, contacts 334 and conductors 346 and 347. The other terminal of motor armature 336 is connected to the supply line 60 through conductors 348 and 350, contacts 335, conductors 351, 352, and 353, contacts 354 of relay 359, and conductor 313. The actuating winding 359ª of relay 359 is normally connected across supply lines 58 and 60 when feed motor 23 is running. Thus, one terminal is connected to supply line 60 through conductor 313 while the other terminal is connected to supply line 58 through conductor 369, normally closed contacts 437 of "jog" relay 288, conductor 458, contacts 333 of contactor 270 or contacts 356 of contactor 271, and conductors 460 and 461. The feed motor 23 is thus energized for rotation in a direction to move the table 11 "in" at a relatively slow feed rate.

Similarly, the motor 23 will be energized to move the table 11 "out" at a relatively slow feed rate upon closure of the normally open contacts 356, 357, and 358 of the reversing contactor 271. In such case, one terminal of the series field winding 338 is permanently connected to supply line 58 as described above while the other terminal is connected to the armature 336 in the opposite sense to that described above, that is, one terminal of the series field winding 338 is connected to one terminal of the armature 336 through a conductor 360, contacts 358, conductors 359 and 348. The other terminal of the armature 336 is connected to supply line 60 through conductors 347 and 346, contacts 357, conductors 352 and 353, resistor 354, and conductor 313. The shunt field winding 337 of course remains permanently connected across the supply lines as before.

A relay 369, provided with an actuating winding 369ª, is adapted to control the flow of current to a signal lamp so that the latter will be lighted whenever feed motor 23 is operating. One terminal of winding 369ª is connected to supply line 60 through conductor 313 while the other is connected to supply line 58 through conductors 399 and 458, contacts 333 of contactor 270 or contacts 356 of contactor 271, and conductors 460 and 461. Energization of relay winding 369ª upon closure of contactors 270 or 271 closes relay contacts 409 completing a circuit for pilot lamp 419 across supply lines 61—62 through a conductor 429. The use of a pilot lamp to indicate the operation of the feed motor is particularly advantageous because the feed rate is often so slow that no motion of the table is apparent from a casual inspection. Consequently, the operator might go away and leave the machine running and consequently liable to be damaged if an indicator were not included to call to his attention the fact that the feed motor was operating.

If it is desired to increase the speed of translation of the table 11, the rapid traverse motor 24 is set in operation. Only the armature 361 of this motor has been shown in order to simplify the illustration but it will be understood that it may be provided with both series and shunt fields, which are connected in substantially the same manner as those described above for the feed motor 23. Operation of the rapid traverse motor 24 is initiated by a digitally operable push button switch 362 which connects actuating winding 363a of a relay 363 across the low voltage supply line 61—62. Energization of the actuating winding 363a closes the normally open relay contacts 364 completing an energizing circuit for actuating winding 365 of the rapid traverse motor contactor 273. Thus, one terminal of the actuating winding 365 is connected to supply line 58 through conductor 366, contacts 364 and conductor 367. The other terminal of the actuating winding is connected to supply line 60 through conductor 368, manually operable switch 370 and conductor 371. This energization of actuating winding 365 closes the normally open contacts 372 and 373 of rapid traverse contactor 273, thus connecting the rapid traverse motor 24 in parallel relation with the feed motor 23. The closure of contacts 372 completes a circuit between common terminals of the motor armatures 336 and 361 through conductors 347, 374, contacts 372, and conductor 375, the other common terminals of the motor armatures being permanently connected together by a conductor 376.

The closure of contacts 373 of the rapid traverse contactor 273 energizes the brake solenoid 26 so as to release the brake 25 and permit rotation of the rapid traverse motor armature. Thus, one terminal of solenoid 26 is normally connected to supply line 58 through conductor 366 while closure of contacts 373 connects the other terminal to supply line 60 through conductor 377, contacts 373, conductors 379 and 368, switch 370, and conductor 371.

The speed of the feed motor 23 may be selectively varied by a speed control mechanism which is, in general, similar to that described above for the spindle driving motor 90. It includes as its principal elements the variable setting rheostat 343 which is operated by a reversible electric motor 378. This rheostat operating motor includes an armature 380 and alternatively energizable field windings 381 and 382. Common terminals of the field winding 382 are connected together by a conductor 383 which is also connected to one terminal of the armature 380. This armature is connected across a resistor 384 by conductors 385 and 386, one terminal of the resistor being connected to supply line 60 through a conductor 387. The opposite terminals of the field windings 381 and 382 are alternatively connected to supply line 58 by speed selector relays 388 and 390 respectively. A pair of digitally operable push button switches 391 and 392 mounted on the pendant 56 serve to complete the energizing circuits of actuating windings 393 and 394 of the relays 388 and 390 respectively across supply lines 61—62. Upon energization of relay actuating winding 393 by closure of push button 391, for example, the normally open relay contacts 395 are closed, thus connecting the motor field winding 381 to supply line 58 through conductors 396 and 397, contacts 395, and conductor 398. Similarly, energization of relay actuating winding 394 upon closure of push button 392 closes normally open relay contacts 400, thus connecting the relay field winding 382 to supply line 58 through conductors 396—397, contacts 400, and conductor 401. When field winding 381 is energized, upon closure of push button 391, the rheostat operating motor 318 rotates in a direction to change the setting of the rheostat 343 so as to increase the resistance in the circuit of shunt field 337 of the feed motor and speed up the latter. In the same way, when field winding 382 of the rheostat operating motor is energized upon closure of push button 392, the setting of rheostat 393 is changed to decrease the resistance in the shunt field circuit of the feed motor so as to decrease the speed of the latter.

It will be noted that no sealing circuits are provided for the relays 388 and 390 and as a consequence, it is necessary to manually hold the push buttons 391 or 392 in their closed positions while altering the speed of the feed motor 23, thus obviating the possibility of an undue change in speed being had through forgetfulness on the part of the operator.

The feed motor 23 may be operated at a special "fast feed" rate if desired by manually maintaining a digitally operable fast feed switch or push button 402 in its closed position. This type of operation is desirable where light cuts are being taken since the cutting tool can then be fed at a higher speed without danger of injury to the material or tool. Closure of push button 402 connects a relay actuating winding 403 of a control relay 404 across supply lines 61 and 62, thus energizing the same. In general, the control relay 404 serves to shunt out the rheostat 343 and substitute for it a fixed resistance element 344, which has a relatively higher resistance, in the energizing circuit of the shunt field 337 for the feed motor 23, thus increasing the speed of operation of the latter. Upon energization of relay winding 403, the normally open contacts 405 of relay 404 are closed while the normally closed contacts 406 thereof are opened. Upon such closure of contacts 405, a shunt circuit is completed about the rheostat 343 through conductors 407 and 408, contacts 405, and conductor 410. At the same time, the opening of contacts 406 break the shunt circuit about the resistance 344 previously formed by conductors 411 and 410. It will be noted that as soon as the "fast feed" switch 402 is released, relay 404 drops out thus reinserting the rheostat 343 in the motor field circuit. Moreover, the setting of the rheostat is unchanged so that by releasing the button 402, the operation will continue at the speed for which the rheostat is set.

The table 11 may be stopped at any time desired by opening the normally closed push button type "stop" switch 412. Such opening of the switch 412 interrupts the energizing circuit of actuating winding 413 of stop relay 292 which is ordinarily connected across supply lines 61—62. The deenergization of actuating winding 413 opens the normally closed contacts 291 of stop relay 292, which are interposed in the sealing circuit of the main switch 276 so that the latter is deenergized and moves to its open position. The opening of the main switch 276 of course deenergizes the reversing contactors 270 and 271 and disconnects both the feed and rapid traverse motors from the supply lines.

An interlock arrangement is preferably provided between the driving mechanisms for the spindle motor and table feed motor so that the control circuit for the translatory table or element will be rendered inoperative except when the driving mechanism for the spindles or rotary elements is in operation. This is a particularly advantageous safety precaution since the liability of moving the work piece into contact with the cutting tool while the latter is at rest is obviated. In the control arrangement illustrated, this interlock arrangement includes the feeder line 285, which is connected to supply line 58 through the spindle motor selector switches and reversing contactors in such manner that no current will be supplied to the feeder 285 and consequently to the main switch 276 of the table control mechanism unless one or both of the spindle motors is in operation. Thus, upon reference to Fig. 2, it will be seen that when the first spindle, that is, spindle 44, is rotating, for example, in a right hand direction, a circuit is completed from feeder conductor 285 to supply line 58 through conductor 414, normally closed contacts 415 and 416 of reversing contactors 101 and 102 respectively, conductor 417, normally closed contacts 255 of selector relay 104, conductors 418 and 419, contacts 117 of selector relay 103, conductor 420, contacts 144 of reversing contactor 96, conductors 421 and 427, contacts 82 of master switch 57, and conductors 78 and 80. Similarly, if selector switch 110 is set for rotation of the spindle 44 in a left hand direction rather than a right hand direction, the circuit is the same as that described above except that it is completed through contacts 174 on reversing contactor 98 rather than contacts 144 of contactor 96. The reversing contactors 101 and 102 are provided with similar auxiliary contacts for completing the circuit between feeler conductor 85 and supply line 58 when the second spindle in the tool head 43 is in operation and spindle 44 is idle. Thus, in case contactor 101 is closed for rotation of the second spindle in a right hand direction, the circuit is completed from the feeder conductor 285 to supply line 58 through conductors 422 and 423, contacts 254 of selector switch 104, conductor 418, normally closed contacts 175 and 145 of contactors 98 and 96 respectively, conductor 424, normally closed contacts 118 of selector switch 103, conductors 420 and 425, contacts 426 of relays 101, conductor 427, contacts 82 of master switch 57, and conductors 78 and 80. In case contactor 102 rather than contactor 101 is closed for left hand rotation of the second spindle, the circuit is the same except that it is completed through contacts 428 of contactor 102 rather than contacts 426 of contactor 101. It should be noted that shifting switches 110 or 111 from their right hand to left hand positions or vice versa will also stop the spindle and interlocked feed motors. In each instance, the "run" switch 125 must be closed for a moment after the change has been made to start the spindle again. In general, each time the feed is stopped, it is necessary to press the "run" switch 281 as an incident to restarting.

The interlocking arrangement between the rotary and translatory driving mechanisms might without special provision cause some difficulty in case a second spindle motor is set in operation while the other spindle motor and table drive mechanism are both running. When it is desired to effect this operation, the "run" push button 125 (Fig. 2) is first closed. Then, if say the spindle 44 is running and the spindle of the tool head 43 is the one to be set in operation, the selector switch 106 is moved to its "on" position. In such case, the second pair of contacts 131 on the run relay 126 completes a shunt circuit through conductors 430 and 431 about the contacts on the selector switches 103 and 104 that form a part of the supply circuit for the feeder conductor 285 and as a result, the latter supply circuit will not be interrupted during the switching operation.

The interlock is preferably arranged in such manner that if both spindles are running, the table will be stopped upon a stoppage of one of the spindles. This is an advantageous safety precaution as the operator might accidentally stop one of the spindles without realizing it. Upon reference to Fig. 2, it will be seen that when both spindle motors are running, the interlock feeder 285 is connected to supply line 58 through contacts 254 of selector relay 104, conductor 419, contacts 117 of selector relay 103, conductors 430 and 420, contacts 174 of contactor 98 or contacts 144 of contactor 96, depending on which is closed, conductor 427, contacts 82 of main switch 57, and conductors 78 and 80. Then, if either selector relay 103 or 104 is opened, stopping its associated spindle motor, the interlock feeder is deenergized thus deenergizing the table control as described above and stopping the table drive mechanism. However, upon occasion the operator may intentionally stop either one of the spindles without affecting the feeds. By depressing the run button 125 and operating the switch 105 or 106 to off position either spindle or both may be stopped without affecting any of the feeds which may be in use.

An additional digitally operable push button "jog" switch 432 is also available for effecting actuation of the reversing contactors 270 and 271 but it is ineffective to maintain a sealing circuit. When the push button switch 432 is closed, a circuit is completed for an actuating winding 433 of the "jog" relay 288 across supply lines 61—62. The energization of actuating winding 433 closes contacts 434, 435, and 436 and opens contacts 287 and 437. As was noted above, one terminal of each of the actuating windings 311 and 320 of contactors 270 and 271 is permanently connected to supply line 60 through conductors 312 and 313. Upon closure of the "jog" switch 432, when the direction selector switch 301 is set for "in" movement, for example, the second terminal of the contactor actuating winding 311 is connected to supply line 58 through conductors 314 and 438, contacts 436, conductors 315 and 316, contacts 307 of selector relay 275, and conductors 317 and 318. Similarly, when the selector switch 301 is set for "out" movement of the table, one terminal of actuating winding 320 of contactor 271 is permanently connected to supply line 60 while the other terminal is connected to supply line 58 through conductors 321 and 441, contacts 435, conductors 322 and 323, contacts 324 of selector relay 274, and conductors 317 and 318. It will be noted that the contacts of "jog" relay 288 in effect form a shunt circuit about the main switch 276 so that reversing contactors 270 and 271 will be actuated irrespective of whether the spindle motors are running. In other words, the interlock described above including the feeder circuit 285 is preferably entirely omitted from the "jog" switch control circuit.

The control circuits governed by the "jog" switch 432 are also preferably arranged so that the speed of the feed motor 23 will be minimized while it is actuated under the control of the "jog" switch. In the arrangement illustrated in Fig. 3, this diminution in the speed of the feed motor 23 upon actuation of the "jog" switch 432 is in general effected by cutting the rheostat 343 and resistor 344 out of the motor shunt field circuit and by interposing a resistor 442 in series relation with the feed motor armature 336. Upon closure of the "jog" switch 432, the "jog" relay 288 is actuated as described above and the contacts 434 thereof are closed completing a shunt circuit about the field rheostat 343. Thus, one terminal of the motor shunt field winding 337 is connected to supply line 58 through conductor 341 as before while the other terminal thereof is connected to supply line 60 through conductors 342, 407, and 408, contacts 434 of "jog" relay 288, conductor 410, contacts 406 of the "fast feed" relay 404, and conductor 411. Consequently, both the rheostat 343 and resistor 344 are shunted out of the motor field circuit. The actuation of the "jog" relay 288 also opens contacts 437 thereby deenergizing actuating winding 359ᵃ of relay 359 and permitting the contacts 354 thereof to move to their open position. This opening of the relay contacts 354 breaks the normal shunt circuit about tse motor armature resistance 442 so that this resistance is connected in series with the motor armature. Thus, upon closure of the main reversing contactor 270, for example, one terminal of the feed motor armature 336 is connected to supply line 60 through conductors 348 and 350, contacts 335, conductors 351, 352, and 353, resistor 442, and conductor 13. Similarly, when the reversing contactor 271 is closed, the other terminal of feed motor armature 336 is connected to supply line 60 through conductors 347 and 346, contacts 357, conductors 352 and 353, resistor 442, and conductor 313. The decrease in the field resistance as well as increase in the resistance of the armature circuit of the feed motor serves to minimize the speeds of the feed motor so that the table 11 is moved at a relatively slow speed while the "jog" switch 432 is held closed.

From the foregoing, it will be seen that translatory movement of the table 11 may be initiated by closing the "run" switch 281 or "jog" switch 432. The sealing circuit is closed, however, only when the run switch 281 is actuated. The switches 432 and 402 as well as the rapid traverse switch 362 must all be manually maintained in their closed position as long as operation under their control is to be had. The sealing circuit closed upon actuation of "run" switch 281 may be interrupted at will to stop the normal feed by momentarily opening the "stop" switch 412 as was described above.

Means is provided for automatically interrupting the operation of the machine upon movement of the table 11 into either of its extreme end positions. This means comprises the two limit switches 305 and 331 interposed respectively in the energizing circuits of the actuating windings 302 and 327 of selector relays 275 and 274. Both limit switches are normally closed and are mounted adjacent opposite ends of the bed 10 for actuation by the table 11. Movement of the table 11 into its extreme "in" and "out" positions will open the switches 305 and 331 to deenergize the coils 302 or 327. The uninterrupted line will, however, permit initiation of table travel in the reverse direction.

It will be seen that in general the secondary switches in the translatory drive control circuit are connected across the low voltage supply lines 61—62 while the primary switches and driving motors are connected across the high voltage supply lines 58—60. Thus, upon reference to Fig. 3, the actuating windings and digitally operable control switches therefor of the secondary relays 388, 390, 277, 292, 288, 404, 274, 275, and 363 are all connected across the low voltage supply lines 61—62. On the other hand, the actuating windings of the primary switches or contactors 270, 271, and 273 as well as the feed and rapid traverse motors 23 and 24 are connected across the high voltage supply lines 58—60.

*Visual indicating mechanism*

As was described above, a visual indicating mechanism such as the meter 203 is preferably mounted on the mobile control pendant 56 in order that the operator may obtain at will an indication of the speed of rotation of either of the spindles. An arrangement is also preferably provided for utilizing this same meter to indicate the feed rate of the table 11 as well as of the rail 34 and of either the head 42 or the head 43 along the rail. In addition, an arrangement is preferably provided for utilizing the meter 203 to indicate the load imposed on either of the spindles during operation of the machine. By so utilizing the single meter 203 to indicate a plurality of operating characteristics of various elements of the machine tool, the operator is afforded full information as to the operation of the machine and at the same time, the apparatus is sufficiently compact that it may be mounted as part of a mobile control station that can be shifted about the machine. The operator is able to run the machine at maximum speed and load with safety when it is equipped with such an indicating mechanism on the control panel since he can move about the machine and carefully inspect the progress of the work while at the same time maintaining his hands directly on the control switches and having a visual indication of the operating characteristics of the various machine elements directly before him.

The mechanism has been previously described by means of which an indication is had on scale 204 of the meter 203 of the speed of rotation of either of the rotatable cutting tool spindles. A scale 445 is also preferably provided on the meter 203 which is calibrated in terms of inches per minute to visually indicate the feed rate. This may be the feed rate of either the table 11, rail 34, or one of the tool heads 42 or 43. A manually operable selector switch 446 mounted on the control pendant 56 below the meter 203 connects the meter for indicating the speed of movement of either the table, the rail, or the tool heads. As shown in Fig. 2, the switch 446 is a three position switch. In one position, it closes a contact 447 which serves to connect an actuating winding 448 of a relay 450 (Fig. 3) across supply line 61—62. Energization of the winding 448 closes the normally open relay contacts 451 and 452 that complete a circuit from tachometer generator 453 (Fig. 3) to the meter 203. In addition, interlocking contacts are provided on the meter selector relays 206 and 223 so that the tachometer generator 453, which is mechanically connected to the table feed mechanism, cannot be connected in circuit with the meter 203 when the latter is connected to the spindle tachometer generator 205.

The table drive mechanism tachometer generator 453 comprises an armature 454 and a field winding 455. One terminal of the field winding 455 is connected to supply line 60 through conductor 456. The other terminal of the field winding is connected to supply line 58 through conductors 457—458, either contacts 333 of contactor 270 or contacts 356 of contactor 271, depending upon which one is closed, and conductors 460—461. The terminals of the tachometer generator armature 454 are connected to contacts 451 and 452 respectively of the indicating selector relay 450 through conductors 462—463, 464—465, contacts 325 and 326 of direction selector relays 274 or contacts 308 and 310 of direction selector relay 275, depending upon which one is closed, conductors 466—467, and conductors 468—470. The contact 451 of relay 450 is connected to one terminal of the meter 203 through conductor 471 (Figs. 2 and 3), conductors 235, meter resistance 236, and conductor 237. The other contact 452 of relay 450 is connected to the second terminal of the meter 203 through conductors 472—473, normally closed contacts 474 of indicator relay 223, conductor 475, normally closed contacts 228 of indicator relay 206, and conductor 243. It will thus be seen that when switch 446 is moved to close contact 447, a circuit will be completed from the table drive mechanism tachometer generator 453 to the meter 203 so that a continual visual indication will be had of the speed of movement of the table.

In some instances, when the table 11 is being moved very slowly, for example, to move a work piece into some exact position, it may be desirable to have the meter 203 indicate the speed of movement in smaller increments. In order to accomplish this purpose, a multiplier has been provided for increasing the readings in multiples of 10. For this purpose, a relay 477 (Fig. 2) is provided having an actuating winding 478 and normally open contacts 480. Upon closure of a digitally operable push button switch 481, the actuating winding 478 is connected across supply lines 61—62 and contacts 480 are closed, thus forming a shunt circuit about the meter resistance 236 through conductors 482 and 483. As a result, the indicator needle of the meter 203 will move 10 divisions to indicate an increment of speed of one inch per minute rather than one division, for example.

Similar control circuits are provided for connecting tachometer generators included in the driving mechanisms for the rail 34 and for the shaft 48 which drives the tool heads 43 and 44. Thus, as shown in Fig. 2, when the selector switch 446 is moved to close contact 484, an actuating winding 485 of a relay 486 is energized, thus closing contacts 487 and 488 thereof, which connect a tachometer generator for the tool head drive mechanism in circuit relation with the meter 203. The details of this circuit and of the circuit for the rail feed tachometer generator have not been shown since they are identical with those for the table drive mechanism.

In order to connect the visual indicating meter 203 for indicating the load on the spindles of the tool heads 42 and 43, the meter scale selector switch 210 is moved to its open or "load" reading position. In such case, the meter 203 is connected across the load resistance 180 (Fig. 2) when indicator switch 208 is closed or across a similar load resistance in the field circuit of the driving motor for the second spindle when indicator switch 256 is closed. Thus, when it is desired to obtain an indication of the load on spindle 44 of tool head 42, indicator switch 208 is closed, thus closing contacts 225 and 226 which are interposed in the meter load reading circuit. Upon closure of these contacts, one terminal of the meter 203 is connected to one terminal of load resistance 180 through conductor 237, normally closed contacts 216 of the scale selector relay 202, conductor 490, contacts 226 of relay 206, and conductor 492. The other terminal of meter 203 is connected to the other terminal of the load resistance 180 through conductors 243 and 493, normally closed contacts 215 of meter scale selector relay 202, conductor 494, contacts 225 of indicator relay 206, and conductor 495. Similarly, when indicator switch 256 is closed, one terminal of meter 203 is connected to a conductor 496 leading to one terminal of the load resistance interposed in the field circuit of the spindle driving motor in tool head 43 through conductor 237, normally closed contacts 216 of relay 202, conductors 490 and 497, and contacts 498 of relay 223. The second terminal of meter 203 is connected to a conductor 500 which is connected to the other terminal of the load resistance in the second spindle driving motor circuit through conductors 243 and 493, contacts 215 of relay 202, conductors 494 and 501, and contacts 502 of relay 223. The load resistors are so related to the meter that the percentage of load may be read on the spindle R. P. M. scale 204. Thus, a reading of 100 indicates a load of 100 per cent and so on. Since the scale readings go to a value of more than 100, overload readings may also be had.

Mobile control station

From the foregoing, it will be apparent that the rotative drive for the spindles in the tool heads 42 and 43 as well as the translatory drive for the table 11 may all be controlled with a great nicety and precision of adjustment from a series of digitally operable control switches or push buttons. The translatory drive mechanisms for the rail 34 and for the tool heads 42 and 43 are provided with control mechanisms identical with that described above for the table 11. These drive mechanisms are also controlled by groups of digitally operable push buttons or switches indicated generally by the numerals 503 and 504 (Fig. 4). Since all of the digitally operable control switches are interposed in low voltage circuits, the switches may be made very small to facilitate compact mounting without danger of breakdown due to arcing.

The digitally operable control switches for the various elements of the machine tool are all preferably mounted on a single mobile control panel. These switches are arranged in groups as indicated in Fig. 4 with suitable legends on the panel to indicate the relation of the groups of switches to the various elements of the machine tool. The operator is thus able to determine at once the proper group of switches for effecting the operation desired. In addition to the controls and indicating mechanism heretofore described as being mounted on the pendant 56, a digitally operable snap switch 505 is also preferably mounted thereon to control a driving motor of a coolant system. Finally, as a special safety precaution, an emergency stop switch is mounted at the bottom of the control panel or pendant 56 so that the operator can shut down the entire machine by the actuation of a single switch in case of an emergency. This switch is indicated by the numeral 507 in Fig. 2 and is preferably provided with a prominent actuating bar 508 extending across the lower portion of the control panel (Fig. 4). The switch 507 is normally closed thus completing an energizing circuit for actuating winding 509 of an emergency stop relay 510 across supply line 61—62 (Fig. 2). Upon opening of switch 507, the actuating winding 509 is deenergized and relay contacts 76 are opened, thereby interrupting the energizing circuit of main switch 68. Upon the opening of main switch 68, the energizing circuits for the contactors controlling the spindle motors are interrupted as are the energizing circuits for the contactors of the motors in the various translatory drives, thus bringing the entire machine to a stop.

From the foregoing, it will be seen that the operator does not need to predetermine the proper feeds and speeds. He can "feel" his way with the various controlling adjustments for the elements of the machine tool until he obtains the maximum performance from the machine.

Due to the small size of the switches mounted on the control panel, it is comparatively thin so that it may be readily grasped at the side edge by the operator with one hand as shown in Figs. 4 and 5. One or more straps are preferably provided on the pendant so that the thumb of the operator's hand will be free to operate the switches. In the preferred construction illustrated, two rigid elongated straps 511 and 512 are disposed on opposite sides of the control pendant or mobile panel 56 in spaced relation thereto. The operator is thus able to insert the fingers of say his left hand between the strap 511 and the adjacent portion of the pendant 56 and in effect grasp the same by pressing the back of his hand against the strap 511 and pressing his fingers against the side and rear surfaces of the pendant. His thumb is thus left free to operate the various push buttons and other switches on the flat front surface of the panel. If desired, the panel may of course be moved about by inserting the right hand between the strap 512 and the adjacent portion of the pendant in the same manner, or, in some cases, it may be desirable to use both hands simultaneously. The elongated openings between the straps 511 and 512 and the adjacent side edges of the pendant 56 make it possible for the operator to slide his hands up and down on the pendant so that switches in different groups may be operated.

The provision of such a mobile control panel that is adapted to be moved about by one hand of the operator adds not only to the efficiency and effectiveness of operation of the machine but also to its safety of operation. The operator in such case is not forced to remain in some more or less remote control station but can, in fact, stand on the table 11 while the machine is operating or in any other position most convenient for viewing the progress of the work. Since he is thus able to inspect the work very closely, the machining operation can be performed with greater precision and rapidity. He is also informed at once of any breakage of a cutting tool or work piece, for example, so that the machine can be stopped instantly before serious damage occurs. The provision of a single visual indicating mechanism which may be utilized to register the operational characteristics of any one of the elements of the machine tool in whatever position the operator may be also contributes to the efficiency of operation of the machine.

For the convenience of the operator, an arrangement is provided for suspending the pendant or mobile control panel 56 above a portion of the machine so that it may be left in such position unsupported by the hands of the operator while he makes any necessary adjustments of the work piece. He is also relieved of the necessity of supporting all or most of the weight of the pendant while the machine is operating. This suspension arrangement is substantially identical with that described and claimed in my prior application Serial No. 9,134 referred to above and consequently need not be described here in detail. In general, the pendant 56 is suspended from the forward end of a rigid, generally horizontal conduit 513 by a flexible armored conduit 514 (Fig. 1). A flexible cable 515 is attached to the conduit 513 so that the leads therein are directed through the latter and the conduit 514 to the pendant 56. The conduit 513 is mounted intermediate its ends for horizontal and vertical pivotal movements on the free end of a rearwardly extending arm 516 supported at its forward end by a vertical pivotal connection 517 on the bridge member 30. A counterweight 518 is mounted on a rearward extension formed on the conduit 513. Horizontal adjustment of the pendant 56 will swing the conduit 513 laterally and also cause a lateral movement of the arm 516 so that the combined linkage minimizes the outward movement of the pendant away from the rail 34 upon lateral adjustment thereof.

Manual adjustment mechanism

An arrangement is preferably provided to adapt the table 11 for manual adjustment or positioning. Such an arrangement is especially advantageous in setting the table and a work piece supported thereby in some particular desired position with respect to one of the cutting tools. In the construction illustrated, manual longitudinal adjustment of the table 11 is effected by means of a hand wheel 524 (Figs. 1 and 3) which is mounted on a shaft 525. The inner end of the shaft 525 is provided with a bevel gear 526 movable into and out of operative engagement complementary with a bevel gear 527 connected to the shaft of the rapid traverse motor 24. The shaft 525 is longitudinally slidable and is biased by a compression spring 528 to a position in which the bevel gears are out of engagement. Upon pushing the hand wheel 524 inwardly, the bevel gears are moved into engagement so that the table is moved upon a subsequent rotation of the hand wheel.

Movement of the hand wheel to a position in which it is operatively connected with the table operating mechanism also serves to release the brake 25 from the shaft of the rapid traverse motor. For this purpose, an operating arm 529 is attached to the switch 370. The operating arm 529 engages suitable collars 530 on the hand wheel shaft 525 so that when the shaft is moved inwardly to bring the bevel gears into engagement, the switch 370 is swung to its uppermost position as viewed in Fig. 3. This closure of the switch 370 in its uppermost position completes an energizing circuit for the brake solenoid 26. Thus, one terminal of the solenoid 26 is connected to supply line 58 through conductor 366 while the other terminal of the solenoid is connected to supply line 60 through a conductor 531, switch 370, and conductor 371. The energization of solenoid 26 resulting from such closure of the switch 370 releases the brake 25 so that the shaft of the rapid traverse motor 24 may be rotated by the hand wheel 524 without impediment from the brake.

When the switch 370 is in its upward position as above described, the circuit extending from line 60 to the rapid traverse contactor winding 365 is broken. The opening of this circuit prevents accidental operation of the rapid traverse motor 24 whenever the hand wheel 524 is engaged therewith.

*Brief résumé of operation*

In starting the machine, the reset switch 65 on the mobile panel 56 is closed momentarily. Thereupon, the master switch 68 is closed permanently to establish connections to the supply lines.

All of the various elements of the machine tool may be controlled from the single mobile panel 56 and the direction of each drive is adapted for independent control. For example, the rotation of the spindle 44 is under the control of switch 110 on the panel 56. Similarly, the direction of travel of the table 11 may be reversed by means of the switch 301 on the panel 56.

The rotative drive for the spindle 44, for example, may be set into operation by moving the selector switch 105 to its "on" position and then closing the run switch 125. This spindle may then be stopped by moving the selector switch 105 to its "off" position. The speed of rotation of the spindle 44 may be increased or decreased, respectively, by holding the "adjust" switch 208 in its closed position and then holding the switch 197 or switch 198 closed until the meter 203 indicates the desired speed has been attained. The rotative drive for the spindle included in the tool head 43 is similarly controlled by the "on" and "off" selector switch 106, "run" switch 125, direction selector switch 111, and speed adjustment switches 256, 197, and 198.

Assuming that one of the spindles is in operation, translation of the table 11 may be instituted by closing either the "run" switch 281, "jog" switch 432, or "rapid traverse" switch 362 and may be stopped by actuating the "stop" switch 412. A maintaining circuit is established when the "run" switch 281 is closed. The "fast feed," "jog," and "rapid traverse" are effected only while the respective switches 402, 432, and 362 are manually held closed. Movement of the table may be had upon closure of the "jog" switch, however, whether the spindle motors are running or not. The rate of feed may be adjusted by closing either the switch 391 or the switch 392 until the indicator 203 shows that the desired feed rate has been attained. The direction of travel of the table 11 is controlled by the direction selector switch 301. The controls 503 and 504 are similarly available for the other translatory drives.

If the table 11 is moved beyond either of its end positions, the control circuits will be interrupted by limit switches 305 or 331, thus stopping the machine by conditioning the control circuits in such manner that the table may be operated in the reverse direction. The loads to which the spindles are subjected are shown by the visual indicator 203.

If either of the spindles is subjected to a predetermined maximum overload, the master switch 57 will be automatically opened by suitable overload relays, thus stopping the operation of the machine. In the particular arrangement illustrated, an overload relay 520 is provided for the driving motor 90 of the spindle 44. This relay includes an actuating winding 522 which is interposed in the series field circuits of the driving motor 90. When a predetermined maximum overload current flows through the winding 522, the normally closed contacts 73 thereof are opened, thus breaking the circuit for the actuating winding 68 of the main control switch 57. Similar overload relays (not shown) are provided in the field circuit of the driving motor for the other spindle also. The machine may also be stopped by actuation of the emergency stop switch 507.

I claim as my invention:

1. A machine tool comprising, in combination, a movable machine tool element, a power actuating mechanism for said machine tool element, a control means for effecting a selected variation in the speed of operation of said machine tool element, a visual indicating meter having a pair of scales thereon calibrated respectively in terms of speed and load, means including an interlock between said control means and said indicating meter for rendering the latter operative to indicate the speed of said machine tool element as an incident to the actuation of said control means, and means operable at will for rendering said meter operative to indicate the load imposed on said machine tool element whereby the operator may be apprised of the change in load on the element resulting from a selected change in speed.

2. A machine tool comprising, in combination, a movable machine tool element, a power actuating mechanism for said machine tool element, control means for effecting a selected variation in the speed of operation of said machine tool element, a visual indicating mechanism operable at will to indicate the speed of operation of said element, and means including an interlock between said control means and said indicating mechanism for rendering the latter operative as an incident to the actuation of said control means.

3. A machine tool comprising, in combination, a movable machine tool element, a power actuating mechanism for said machine tool element, control means for effecting a selected variation in the speed of operation of said machine tool element, a visual indicating mechanism, means including a switch operable at will for rendering said indicating mechanism operative to indicate the speed of operation of said machine tool element, and means operable by said last named means for rendering said control means operative to change the speed of said machine tool element only when said indicating mechanism is operative to indicate the speed of said element.

4. A machine tool comprising, in combination, a plurality of cooperating relatively movable machine tool elements, individual power actuating mechanisms for said machine tool elements, individual control means for effecting selected variations in the speeds of operation of said machine tool elements, a single visual indicating mechanism operable at will to indicate the speed of operation of any selected one of said elements, and means including an interlock between said control means and said indicating mechanism for rendering any one of said control means inoperative to effect a variation in the speed of its associated machine tool element except when said indicating mechanism is conditioned for indicating the speed of operation of such associated machine tool element.

5. A machine tool comprising, in combination, a plurality of movable machine tool elements, individual power actuating mechanisms for each of said machine tool elements, individual electrically operated control means for varying the speed of operation of each of said machine tool elements, means including a pair of manual speed control switches selectively operable to render one of said control means operative to increase or decrease the speed of its associated power actuating mechanisms, means including a selector switch for connecting said manual speed control switches in circuit relation with a selected one of said control means, a single visual speed indicating mechanism, means operable at will for rendering said visual indicating mechanism operative to indicate the speed of a selected one of said machine tool elements, and interlocking means for preventing a change in speed of any of said machine tool elements under the control of said manual speed control switches except when said indicating mechanism is rendered operative to indicate the speed of such machine tool element.

6. A machine tool comprising, in combination, a rotatable machine tool element, a translatory machine tool element, individual power actuating mechanisms for said elements, selectively operable control means for initiating operation of said power actuating mechanisms, interlock means for preventing the operation of at least one of said elements except when the other of said elements is in operation, and a jog control means including a manually operable control member for initiating operation of said one element irrespective of the operation of said other element in response to the manual maintenance of said control member in a predetermined position.

7. A machine tool comprising, in combination, a rotatable cutting tool element, a translatory work supporting element, individual power actuating mechanisms for said rotatable and translatory machine tool elements, control means operable in response to a momentary actuation of a manually operable control member for rendering said power actuating mechanism for said translatory machine tool element operative, interlocking means for preventing the operation of said power actuating mechanism for said translatory machine tool element in response to an actuation of said control member except when said rotatable machine tool element is in operation, and means including a second manually operable control member normally biased to a predetermined position for rendering said power actuating mechanism of said translatory machine tool element operative to move the same in response to movement of said second control member against its normal bias.

8. A machine tool comprising, in combination, a rotatable cutting tool element, a translatory work supporting element, a power actuating mechanism for said rotatable element, a second power actuating mechanism selectively operable to traverse said translatory element at a relatively slow feed rate and at a relatively faster rapid traverse rate, control means operable in response to momentary actuation of a selected one of a pair of manually operable control members for rendering said second power actuating mechanism operative to traverse said translatory element at a feed rate or rapid traverse rate, interlocking means for preventing the operation of said second power actuating mechanism in response to an actuation of either of said control members except when said rotatable machine tool element is in operation, and means including a third manually operable control member normally biased to a predetermined position for rendering said second power actuated mechanism operative to traverse said translatory machine tool element at a rate which is a fraction of said feed rate in response to movement of said third control member against its normal bias.

9. A machine tool comprising, in combination, a plurality of rotatable cutting tool elements, a translatory work supporting element, individual power actuating means for each of said machine tool elements, selectively operable means for rendering said power actuating means for said rotatable cutting tool elements operative and inoperative, a second control means for selectively rendering said power actuating means for said translatory work supporting element operative and inoperative, and interlocking means for preventing the operation of said translatory work supporting element except when at least one of said rotatable cutting tool elements is in operation.

10. A machine tool comprising, in combination, a plurality of rotatable cutting tool elements, a translatory work supporting element, individual power actuating means for each of said machine tool elements, selectively operable means for rendering said power actuating means for said rotatable cutting tool elements operative and inoperative, a second control means for selectively rendering said power actuating means for said translatory work supporting element operative and inoperative, interlocking means for preventing the operation of said translatory work supporting element except when at least one of said rotatable cutting tool elements is in operation, and means for maintaining said actuating means for said translatory element operative during the subsequent initiation of operation of one of said rotatable elements while the other of said rotatable elements is in operation.

11. A machine tool comprising, in combination, a plurality of rotatable cutting tool elements, a translatory work supporting element, individual power actuating means for each of said machine tool elements, selectively operable means for rendering said power actuating means for said rotatable cutting tool elements operative and inoperative, a second control means for selectively rendering said power actuating means for said translatory work supporting element operative and inoperative, interlocking means for preventing the operation of said translatory work supporting element except when at least one of said rotatable cutting tool elements is in operation, and means for rendering said translatory work supporting element inoperative in response to the stoppage of one of said rotatable cutting tool elements, subsequent to the simultaneous operation of all of said machine tool elements.

12. In a machine tool, a movable machine tool element, electrically controlled power actuating means for said machine tool element, a mobile control panel having an elongated substantially rectangular front surface, a rigid strap secured to said panel and extending in spaced relation to one longitudinal edge thereof, said strap being spaced from said panel a sufficient distance to permit the insertion of an operator's hand therebetween, and a plurality of digitally operable control switches disposed on said front surface of said panel, said switches being located within range of the thumb of a normal human hand having the fingers thereof inserted between said strap and said panel.

13. In a machine tool, a movable machine tool element, electrically controlled power actuating means for said machine tool element, a mobile control panel having a plurality of digitally operable switches thereon connected in controlling relation with said power actuating means, a strap secured to said panel and adapted to receive the palm of an operator's hand inserted between said strap and the adjacent portion of the panel, whereby the operator may press the back of his hand against the strap and press the fingers of such one hand against the back of the panel to move the same about the machine while the thumb of such hand is left free to actuate said switches.

14. In a machine tool, a movable machine tool element, electrically controlled power actuating means for said machine tool element, and a mobile control panel having a plurality of digitally operable switches thereon connected in controlling relation with said power actuating means, said panel having a recess adapted to receive the fingers of an operator's hand inserted therein to shift the panel about the machine while leaving the thumb of such hand free to manipulate said digitally operable switches.

15. In a machine tool, a movable machine tool element, electrically controlled power actuating means for said machine tool element, a mobile control panel having a plurality of digitally operable switches thereon connected in controlling relation with said power actuating means, and means including a flexible cable for supporting said panel adjacent said machine tool element, said panel having a recess adapted to receive the fingers of an operator's hand inserted therein to shift the panel about the machine while leaving the thumb of such hand free to manipulate said digitally operable switches.

16. A machine tool comprising, in combination, a plurality of movable machine tool elements, individual power actuating mechanisms for each of said machine tool elements, individual electrically operated control means for varying the speed of operation of each of said machine tool elements, means including a pair of manual speed control switches selectively operable to render one of said control means operative to increase or decrease the speed of its associated power actuating mechanism, and means including a selector switch for connecting said manual speed control switches in circuit relation with a selected one of said control means.

17. A machine tool comprising, in combination, a translatory machine tool element, means including an electric motor for traversing said element at a relatively slow feed rate, means including a second electric motor cooperating with said first named motor for traversing said element at a relatively faster rapid traverse rate, electrical supply lines for said motors, means including a pair of selectively operable reversing switches for connecting said first named motor across said supply lines to energize the same for rotation in a selected direction and thereby effect a feed movement of said machine tool element in a selected direction, and means including a third switch for selectively connecting said second motor in parallel relation with said first named motor to effect a rapid traverse movement of said machine tool element in a direction dependent upon the setting of said reversing switches.

18. A machine tool comprising, in combination, a translatory machine tool element, means including an electric motor for traversing said element at a relatively slow feed rate, means including a second electric motor cooperating with said first named motor for traversing said element at a relatively faster rapid traverse rate, electrical supply lines for said motors, means including a pair of electrically operated primary reversing switches for connecting said first named motor across said supply lines to energize the same for rotation in a selected direction and thereby effecting feed movement of said machine tool element in a selected direction, a manually operable two-position selector switch for conditioning a selected one of said pair of primary reversing switches for operation, means including a reversing manually operable push button switch for energizing a selected one of said primary switches in response to a momentary actuation of said push button switch, and means including a switch for selectively connecting said second motor in parallel circuit relation with said first named motor to effect a rapid traverse movement of said machine tool element in a direction depending upon the setting of said reversing switches.

19. A machine tool comprising, in combination, a translatory machine tool element, means including an electric motor for traversing said element at a relatively slow feed rate, means including a second electric motor cooperating with said first named motor for traversing said element at a relatively faster rapid traverse rate, electrical supply lines for said motors, means including a pair of electrically operated primary reversing switches for connecting said first named motor across said supply lines to energize the same for rotation in a selected direction and thereby effecting feed movement of said machine tool element in a selected direction, a manually operable two-position selector switch for conditioning a selected one of said pair of primary reversing switches for operation, means including a reversing manually operable push button switch for energizing a selected one of said primary switches in response to a momentary actuation of said push button switch, means including a third primary electrically operable switch for connecting said second motor in parallel relation with said first named motor to effect a rapid traverse movement of said machine tool element in a direction dependent upon the setting of said reversing switches, and means including a second manually operable push button switch for energizing said third primary switch only when said second push button switch is maintained in a predetermined position.

20. A machine tool comprising, in combination, a movable machine tool element, a selectively energizable power actuating mechanism operatively connected to said machine tool element, means including a brake for preventing movement of said actuating mechanism when deenergized, manually operable means for shifting said machine tool element, and means responsive to the actuation of said operable means for releasing said brake.

21. A machine tool comprising, in combination, a movable machine tool element, a rapid traverse motor and a feed motor, means including a differential gear mechanism for connecting said motors in operative relation with said machine tool element, a brake for selectively preventing movement of said rapid traverse motor, an operating solenoid for releasing said brake upon energization of said rapid traverse motor, manually operable means operatively connected to said rapid traverse motor for shifting said machine tool element, and means responsive to the actuation of said manually operable means for energizing said solenoid to release said brake.

22. In a machine tool the combination of a plurality of relatively movable machine tool elements, individual variable-speed power actuating mechanisms for said elements each provided with a variable-setting speed-change device, a single speed-change control, and selectively operable means for rendering said single control operative to change the setting of any selected one of said speed-change devices.

23. In a machine tool, a movable machine tool element, power actuating means for said element, a mobile control panel having an opening for receiving a portion of an operator's hand by which the panel may be moved laterally in opposite directions while leaving a digit of said hand free, and a plurality of control devices on said panel governing the selective operation of said power actuating means and operable selectively by said free digit while said portion of the operator's hand is inserted in said opening.

24. In a machine tool, the combination of movable machine elements, power driven means for actuating said elements individually, a control panel, means disposed at one side of the panel face and adapted to embrace a portion of an operator's hand so as to permit the panel to be held and moved in different directions without the use of the thumb of said hand whereby to leave the thumb free and movable at all times, and a plurality of manually operable control devices longitudinally spaced along said panel front and individually accessible to and operable by the thumb of said hand, said devices being operable to control the selective operation of said actuating means.

25. In a machine tool, the combination of movable machine elements, power driven means for actuating said elements individually, an elongated control panel, means extending along said panel for receiving and embracing a portion of an operator's hand for holding the panel while permitting shifting of the hand along the panel and leaving the thumb of such hand free and movable in front of the panel, and a plurality of manually operable control devices longitudinally spaced along said panel front and individually accessible to and operable by the thumb of said hand in different positions of the latter along the panel, said devices being operable to control the selective operation of said actuating means.

26. In a machine tool, the combination of machine tool elements, power driven mechanism for actuating said elements individually and at selectively variable speeds, electric control means for said mechanism including a mobile panel movable about the machine so as to be accessible to the operator in different positions, a plurality of switches on said panel selectively controlling said actuating means to govern the movements of the different elements, an electrically actuated meter carried by and movable with said panel adjacent said switches and operable to indicate the rate of a plurality of said movements, and means also carried by said panel so as to be movable therewith and operable to associate said meter with said elements individually whereby to adapt the meter for indicating the speed of the associated element.

27. In a machine tool, the combination of machine tool elements relatively movable to perform metal-removing operations on work pieces supported in the machine tool, power driven mechanism located remotely from a work piece being operated on and operable to actuate said elements selectively at variable speeds, a control panel disposed remotely from said mechanism adjacent a work piece being operated on so as to be accessible and visible to an operator in different positions about the work piece, a plurality of manually operable switch control devices on the face of said panel operable selectively to govern the operation of said mechanism in actuating said elements individually, a single electric actuated meter for visually indicating the speed of a plurality of said movements, and selector means carried by said panel and operable to associate the meter with said elements one at a time and thereby adapt the same for indicating the speed of the associated elements during actuation of the latter by said mechanism.

28. In a machine tool, the combination of a plurality of movable machine tool elements, individual power actuators for driving said elements at variable speeds, manually operable means for controlling said actuators selectively to initiate and terminate the movements of the different elements, manually controllable speed adjusting means operable selectively to increase and decrease the speed adjustment of the different actuators, an electrically actuated meter for indicating the operating speeds of said elements, switching means selectively operable to associate said meter with different ones of said actuators for indicating the operating speed of an individual machine tool element, and interlocking means actuated automatically by said switching means and operating to place said speed adjusting means in active control of one of said actuators automatically as an incident to association of the latter with said meter and to withdraw such actuator from control by the adjusting means when the meter is associated with another of said actuators.

WILLIAM F. RIDGWAY.